US011933456B2

(12) United States Patent
Deletre et al.

(10) Patent No.: US 11,933,456 B2
(45) Date of Patent: Mar. 19, 2024

(54) THERMALLY INSULATING SEALED TANK

(71) Applicant: GAZTRANSPORT ET TECHNIGAZ, Saint Remy les Chevreuse (FR)

(72) Inventors: Bruno Deletre, Saint Remy les Chevreuse (FR); Catherine Boucard, Saint Remy les Chevreuse (FR); Camille Gourmelen, Saint Remy les Chevreuse (FR); Laurine Senseby, Saint Remy les Chevreuse (FR)

(73) Assignee: GAZTRANSPORT ET TECHNIGAZ, Saint Remy les Chevreuse (FR)

( * ) Notice: Subject to any disclaimer, the term of this patent is extended or adjusted under 35 U.S.C. 154(b) by 349 days.

(21) Appl. No.: 17/442,475

(22) PCT Filed: Apr. 1, 2020

(86) PCT No.: PCT/EP2020/059235
§ 371 (c)(1),
(2) Date: Sep. 23, 2021

(87) PCT Pub. No.: WO2020/201344
PCT Pub. Date: Oct. 8, 2020

(65) Prior Publication Data

US 2022/0163167 A1 May 26, 2022

(30) Foreign Application Priority Data

Apr. 1, 2019 (FR) ....................................... 1903477

(51) Int. Cl.
*F17C 3/02* (2006.01)

(52) U.S. Cl.
CPC ...... *F17C 3/027* (2013.01); *F17C 2201/0157* (2013.01); *F17C 2201/052* (2013.01);
(Continued)

(58) Field of Classification Search
CPC .............. F17C 3/027; F17C 2201/0157; F17C 2201/052; F17C 2203/0358;
(Continued)

(56) References Cited

U.S. PATENT DOCUMENTS

2016/0120071 A1* 4/2016 Shedd ........................ F28F 3/12
361/679.47
2016/0128238 A1* 5/2016 Shedd ..................... F25B 41/42
361/679.47
(Continued)

FOREIGN PATENT DOCUMENTS

FR 2259008 A 8/1975
FR 2265608 A2 10/1975
(Continued)

OTHER PUBLICATIONS

International Search Report for corresponding PCT application No. PCT/EP2020/059235, dated Jun. 8, 2020.

*Primary Examiner* — Kareen K Thomas
(74) *Attorney, Agent, or Firm* — Notaro, Michalos & Zaccaria P.C.

(57) ABSTRACT

A sealed and thermally insulating tank incorporated in a supporting structure (2), the tank including at least one inclined tank wall (1) forming an angle with a horizontal direction and fixed to a supporting wall of the supporting structure (2) is disclosed. The tank wall (1) has a multilayer structure including successively, in the direction of thickness from the outside to the inside of the tank, a thermally insulating barrier (3) held against the corresponding supporting wall and a sealed membrane (4) carried by the thermally insulating barrier (3). The tank includes sealed strips (15) in the space formed between the thermally insulating barrier (3) and the supporting wall.

20 Claims, 6 Drawing Sheets

(52) U.S. Cl.
CPC ................. *F17C 2203/0358* (2013.01); *F17C 2203/0631* (2013.01); *F17C 2203/066* (2013.01); *F17C 2221/016* (2013.01); *F17C 2221/033* (2013.01); *F17C 2221/035* (2013.01); *F17C 2223/0153* (2013.01); *F17C 2260/033* (2013.01); *F17C 2270/0107* (2013.01)

(58) Field of Classification Search
CPC ........ F17C 2203/0631; F17C 2203/066; F17C 2221/016; F17C 2221/033; F17C 2221/035; F17C 2223/0153; F17C 2260/033; F17C 2270/0107; F17C 2221/032; F17C 2223/0161; F17C 2223/033; B63B 25/16
See application file for complete search history.

(56) References Cited

U.S. PATENT DOCUMENTS

| | | | | |
|---|---|---|---|---|
| 2016/0146507 | A1* | 5/2016 | Johnson | F24S 50/20 126/714 |
| 2016/0160515 | A1* | 6/2016 | Wallance | E04F 10/10 52/745.02 |
| 2016/0280335 | A1* | 9/2016 | Sano | F17C 3/00 |
| 2018/0366697 | A1* | 12/2018 | Elfering | H01M 50/509 |
| 2019/0101310 | A1* | 4/2019 | Miles | F24S 80/65 |

FOREIGN PATENT DOCUMENTS

| | | | |
|---|---|---|---|
| FR | 2343965 | A1 | 10/1977 |
| FR | 3058498 | A1 | 5/2018 |

* cited by examiner

THERMALLY INSULATING SEALED TANK

TECHNICAL FIELD

The invention relates to the field of sealed and thermally insulating membrane tanks. The invention relates in particular to the field of sealed and thermally insulating tanks for the storage and/or the transport of liquefied gas at low temperature, such as tanks for the transfer of liquefied petroleum gas (LPG) at for example a temperature between −50° C. and 0° C. or for the transport of liquefied natural gas (LNG) at approximately −162° C. at atmospheric pressure, or again for the storage of liquid argon at approximately −185° C. These tanks may be installed on land or on a floating structure. In the case of a floating structure, the tank may be intended for the transport of liquefied gas or to receive liquefied gas serving as fuel for the propulsion of the floating structure.

TECHNOLOGICAL BACKGROUND

The document FR2265608 described a sealed and thermally insulating tank integrated into the supporting structure of a ship, comprising a secondary thermally insulating barrier, a secondary sealed membrane, a primary thermally insulating barrier and a primary sealed membrane. The document more particularly describes a method of placing the secondary thermally insulating barrier on the supporting structure.

The secondary thermally insulating barrier of the above document comprises a plurality of secondary insulating boxes filled with a thermal insulation material and juxtaposed to one another. The secondary insulating boxes are fixed directly to the supporting structure of the ship. The ship structure may have flatness irregularities. In order to alleviate flatness defects of the supporting structure strips of mastic are disposed on the face of the boxes bearing against the supporting structure. Thus the mastic enables flatness defects to be absorbed by being crushed to a greater or lesser extent under the insulating box.

However, in arrangements of this kind there is therefore between two juxtaposed insulating boxes a space between the secondary thermally insulating barrier and the supporting structure over all the dimension of the tank wall. Such a space is also found between the secondary sealed membrane and the secondary thermally insulating barrier.

The secondary sealed membrane being at very low temperatures and the supporting structure at an ambient temperature, it has been found that a thermosiphon phenomenon arose in the inclined walls forming an angle to a horizontal direction, for example vertical walls of the tank, with the circulation of a gas (or gas mixture) cooling and therefore descending relative to the vertical direction between the secondary sealed membrane and the secondary thermally insulating barrier and the circulation of a gas warming and therefore ascending relative to the vertical direction between the secondary thermally insulating barrier and the supporting wall. The circulation of the cooling gas and the circulation of the warming gas forms a closed circuit at the ends of the tank wall which favors the convective transfer of heat through the tank wall.

This thermosiphon effect prevents the thermally insulating barrier from fulfilling its insulation role effectively and can therefore damage the external structure of the tank by propagating the extreme temperatures of the content of the tank to the latter.

The invention aims to remedy this problem.

SUMMARY

One idea behind the invention is to prevent a circulation of gas by thermosiphon effect from being established in an inclined wall.

In accordance with one embodiment, the invention provides a sealed and thermally insulating tank incorporated in a supporting structure, the tank including at least one inclined tank wall forming an angle with a horizontal direction perpendicular to the terrestrial gravity field and fixed to a supporting wall of the supporting structure, the tank wall having a multilayer structure including successively, in the direction of thickness from the outside to the inside of the tank, a thermally insulating barrier held against the corresponding supporting wall and a sealed membrane carried by the thermally insulating barrier, the tank including sealed or substantially sealed strips in the space formed between the thermally insulating barrier and the supporting wall, wherein the sealed or substantially sealed strips segment the space between the thermally insulating barrier and the supporting wall in a plurality of successive zones in a direction of greatest slope of the wall, the zones extending over an entire transverse dimension of the tank wall in a transverse direction inclined relative to the direction of greatest slope.

Thanks to these features, the gas situated between the supporting structure and the secondary thermally insulating barrier which on warming would be caused to rise in the inclined wall is here blocked in its circulation by the segmentation of this space into a plurality of zones with the aid of sealed strips. Thus the thermosiphon effect cannot become established. In effect, when a gas is warmed its volume per unit mass decreases, and it tends to move in a direction contrary to that of the terrestrial gravity field, and therefore to rise in the inclined wall. Similarly, when a gas cools its mass per unit volume increases, and it tends to move in the direction of the terrestrial gravity field and therefore to descend in the inclined wall.

Here the expression “a plurality of zones in succession in a direction of greatest slope” means that in following a line of greatest slope of the tank wall the zones are encountered successively one after the other.

In accordance with embodiments, this kind of tank may have one or more of the following features.

In accordance with one embodiment, the transverse direction is orthogonal or oblique to the direction of greatest slope. In accordance with one embodiment, the supporting wall is plane and the transverse direction and the direction of greatest slope are situated in the plane of the supporting wall.

In accordance with one embodiment, at least one of the, some of the or all of the sealed or substantially sealed strips has or have a varying thickness in the transverse direction in order to compensate any flatness defects of the supporting structure.

In accordance with one embodiment, at least one of the, some of the or all of the sealed or substantially sealed strips is or are extended over all the transverse dimension of the tank wall.

In accordance with one embodiment, at least one of the, some of the or all of the sealed or substantially sealed strips is or are formed of a polymer material, for example a mastic or a closed cell foam, for example a closed cell polyurethane foam, or the combination of an ethylene-propylene-diene monomer (EPDM) rubber strip with a polyester foam strip.

In accordance with one embodiment, at least one of the, some of the or all of the sealed or substantially sealed strips includes a plurality of strip portions connected to one another in sealed manner by at least one fishplate, the fishplate being disposed between two adjacent strip portions.

Here by connected in sealed manner means that the sealing properties of the strip portions are preserved at the level of the connection between two strip portions, thereby ensuring that no circulation space is left free between the fishplate and a strip portion.

Thus the sealed strip extends globally in the transverse direction, strip portions of said sealed strip being able in a localized manner to follow another direction, for example so as to form a crenellated line.

Moreover, the fishplate, which is made of a rigid material, such as wood or plywood for example, makes it possible to prevent excessive crushing of the sealed strips when placing the thermally insulating barrier against the supporting wall. In effect, the thickness of a fishplate is preferably less than the adjacent strip portions so that the strip portions are also slightly compressed in a range of elastic deformation, preventing compression in their plastic range.

In accordance with one embodiment, the fishplate comprises a first end situated in a first strip portion and a second end situated in a second strip portion, the second strip portion being adjacent to the first strip portion.

In accordance with one embodiment, the thermally insulating barrier comprises a plurality of insulating blocks juxtaposed to one another in the direction of greatest slope and in the transverse direction.

In accordance with one embodiment, at least one of the, some of the or all of the sealed or substantially sealed strips are interrupted at the level of an interface or of an interstice between two adjacent insulating blocks, the fishplate being disposed between two adjacent insulating blocks so as to connect in sealed manner two adjacent strip portions.

In accordance with one embodiment, at least one of the, some of the or all of the sealed or substantially sealed strips is traversed by a communication channel, the communication channel preferably being a high head loss communication channel, so that the zones separated by said at least one substantially sealed strip are in slow fluidic communication, enabling the pressure to be balanced between the two zones without allowing significant convection circulation.

Accordingly, each zone communicates with the adjacent zones so as to enable balancing of the pressures in the space between the thermally insulating barrier and the supporting structure. Nevertheless, to prevent that communication contributing to creating circulation by the thermosiphon effect, it is preferable to design the communication channel so that it is a high head loss communication channel for a flow of gas flowing in the direction of greatest slope of the tank wall. A porous material may also be placed in the communication channel to contribute to the head loss in the communication channel.

Here the expression "high head loss communication channel" means that the communication channel allows fluidic communication that generates a high head loss in a flow passing through the channel. That high head loss may be generated by a particular geometry, for example a chicane, and/or a dimension of the channel sufficiently small relative to the dimension of the tank wall to generate a singular head loss by sudden reduction of the flow section and/or positioning a porous material in the communication channel, that material having an appropriate coefficient of permeability. For example, this porous material may have a coefficient of permeability between $5.10^{-8}$ to $10^{-10}$ $m^2$ inclusive for substantially sealed strip dimensions in the direction of greatest slope of 10 to 50 mm.

In accordance with one embodiment, the thermally insulating barrier comprises a plurality of rows of insulating blocks extending in the transverse direction, the insulating blocks having a longitudinal dimension in the direction of greatest slope, two adjacent sealed or substantially sealed strips being spaced from one another in the direction of greatest slope by a dimension equal or substantially equal to the longitudinal dimension of the insulating blocks.

In accordance with one embodiment, at least one of, a plurality of or all of the substantially sealed strips is or are traversed by a plurality of communication channels distributed over the substantially sealed strip.

In accordance with one embodiment, at least one of, some of or all of the strip portions extending in the transverse direction is or are interrupted by a high head loss communication channel.

In accordance with one embodiment, at least one of, some of or all of the substantially sealed strips is or are discontinuous only at the level of the communication channel or channels. Thus the substantially sealed strips are interrupted only in a localized manner over all the transverse dimension of the wall.

In accordance with one embodiment, at least one of, some of or all of the sealed strips is or are continuous over all the transverse direction of the tank wall.

In accordance with one embodiment, the communication channel of a substantially sealed strip is offset from less one communication channel of an adjacent substantially sealed strip in the transverse direction so as to form a network of communication channels in a quincunx arrangement.

In accordance with one embodiment, the tank wall comprises two transverse edges extending in the direction of greatest slope, each substantially sealed strip comprising at least one or only one communication channel situated near one of the transverse edges of the tank wall.

In accordance with one embodiment, each zone is in fluidic communication with an adjacent zone via at least high head loss communication channel.

In accordance with one embodiment, the head loss of a communication channel is greater than or equal to $$\Delta P = \frac{P_G}{n-1},$$

where $\Delta P$ is the minimum head loss of the communication channel, $P_G$ the driving pressure of the gas situated in the space between the thermally insulating barrier and the supporting structure of the tank wall under normal conditions of use of the tank, and n representing the number of zones segmented by the substantially sealed strips.

The minimum head loss of the communication channel can be calculated as a function of a maximum permitted speed, itself calculated as a function of the heat that the flow is liable to direct through the channel, for example a few cm/sec.

The minimum head loss $\Delta P$ at the maximum tolerated flow rate (i.e. calculated in the channel in such a manner as to limit the term Q.p.Cp.$\Delta$T) by $$\Delta P \geq \frac{P_G}{dH}.$$

The driving pressure $P_G$ of the gas can be calculated as follows:

$$P_G = \Delta\rho \times g \times dH$$

where Δp is the difference between the masses per unit volume (ρ(Tf)−ρ(Tc)), Tf is the temperature of the cold source and Tc is the temperature of the hot source, dH is the vertical pitch of the separations.

Example: the hull and secondary membrane temperatures are 30° C. and −160° C. (during an invasion of the primary zone for example), the corresponding masses per unit volume of nitrogen are 1.2 kg/m^3 and of 3.1 kg/m^3. $P_G$/dH=1.86 mbar/m or 186 Pa/m. If the segmentation is every X meters, there will for example be observed a head loss of X*186 Pa at the maximum speed (or flow rate) tolerated in the communication channel.

In accordance with one embodiment, the high head loss communication channel includes a porous material filling the communication channel, the porous material having a porosity configured to result in a head loss greater than or equal to the minimum head loss ΔP.

In accordance with one embodiment, the porous material of the communication channel is chosen from melamine foam, open cell polyurethane (PU) foam, polyethylene wadding, fiber braids, for example glass, hemp, linen or cotton fiber braids.

In accordance with one embodiment, the sealed membrane consists of a corrugated sealed membrane including a plurality of corrugated metal plates welded to one another.

In accordance with one embodiment, the tank comprises only one sealed membrane.

In accordance with one embodiment, the sealed membrane is a secondary sealed membrane and the thermally insulating barrier is a secondary thermally insulating barrier, the tank including a primary thermally insulating barrier carried by the secondary sealed membrane and a primary sealed membrane carried by the primary thermally insulating barrier.

Such a tank may form part of a terrestrial storage installation, for example for storing LNG, liquid argon or LPG, or be installed in a coastal or deep water floating structure, in particular a methane tanker ship, a floating storage and regassification unit (FSRU), a Floating Production Storage and Offloading (FPSO) unit, etc. Such a tank may also serve as a fuel tank in any type of ship.

In accordance with one embodiment, a ship for the transport of a cold liquid product includes a double hull and a tank as aforementioned disposed in the double hull.

In accordance with one embodiment, the invention also provides a transfer system for a cold liquid product, the system including the aforementioned ship, insulated pipes arranged in such a manner as to connect the tank installed in the hull of the ship to a floating or terrestrial storage unit and a pump for driving a flow of cold liquid product through the insulated pipes from or to the floating or terrestrial storage installation to or from the tank of the ship.

In accordance with one embodiment, the invention also provides a method of loading or offloading such a ship, in which a cold liquid product is routed through insulated pipes from or to a floating or terrestrial storage installation to or from the tank of the ship.

BRIEF DESCRIPTION OF THE FIGURES

The invention will be better understood and better aims, details, features and advantages thereof will become more clearly apparent during the following description of a plurality of particular embodiments of the invention given by way of nonlimiting illustration only with reference to the appended drawings.

DESCRIPTION OF EMBODIMENTS

In the description hereinafter there will be describe a sealed and thermally insulating tank 71 comprising at least one inclined tank wall 1 forming an angle with a horizontal direction and fixed to a supporting wall of the supporting structure 2. The particular case of a vertical wall will be described hereinafter. However, the invention is not limited to the particular case of a vertical wall.

In the case of a vertical wall, the direction of greatest slope 51 of that wall is therefore the vertical direction. Here the term "vertical" means extending in the direction of the terrestrial gravity field. Here the term "horizontal" means extending in a direction perpendicular to the vertical direction.

Figure 1:
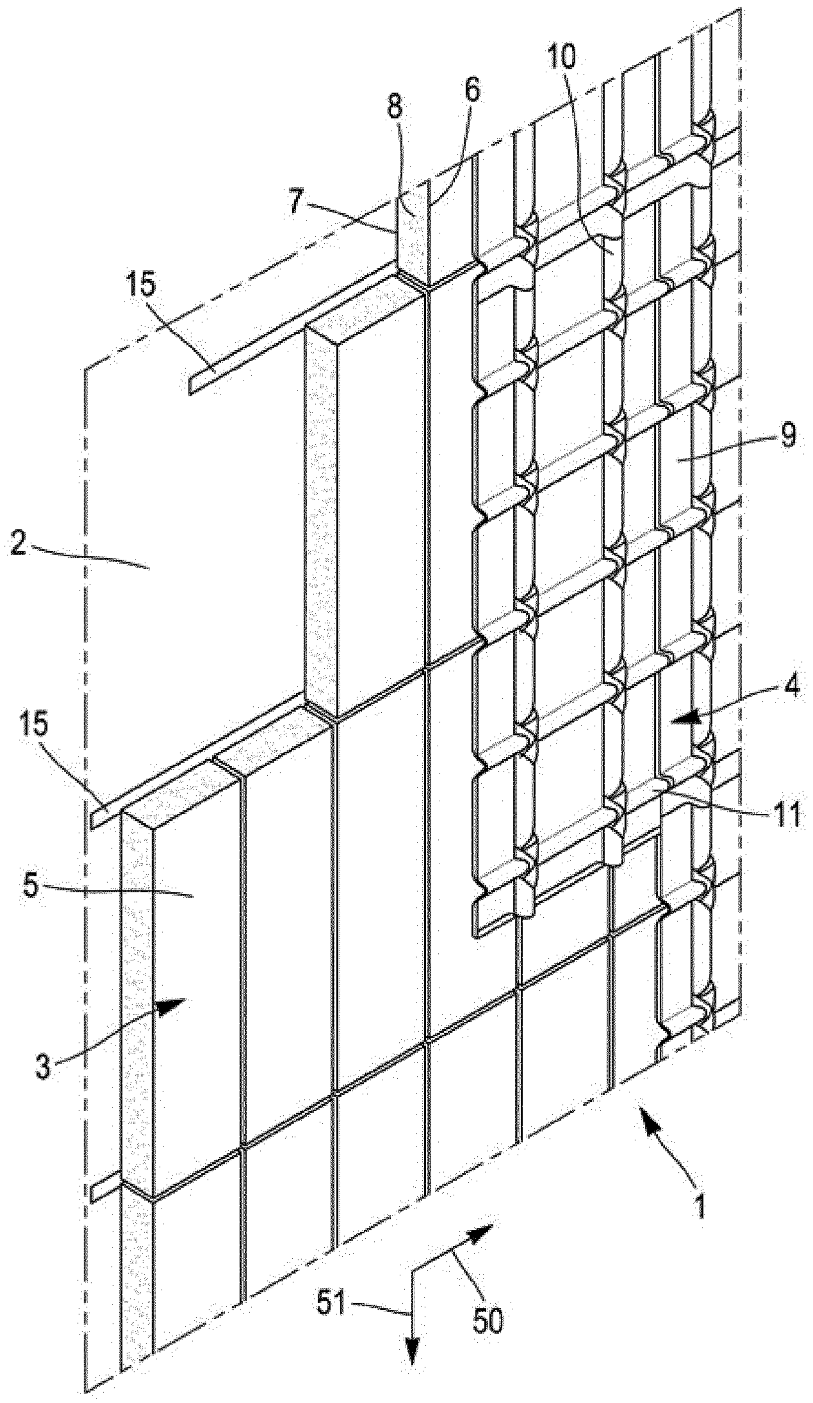
FIG. 1 is a cutaway perspective view of a tank wall in accordance with a first embodiment.

As represented in FIG. 1, the tank wall 1 has a multilayer structure including successively, in the direction 52 of thickness from the outside to the inside of the tank 71, a thermally insulating barrier 3 retained against the supporting wall 2 and a sealed membrane 4 carried by the thermally insulating barrier 3.

In the embodiment represented the thermally insulating barrier 3 includes a plurality of insulating blocks 5 that are anchored to the supporting wall 2 by means of retaining devices or couplers (not represented). The insulating blocks 5 have a parallelepipedal general shape and are disposed in parallel rows. The insulating blocks 5 may be produced with various structures.

An insulating block 5 may be produced in the form of a box including a bottom plate, a cover plate and supporting webs extending in the direction of thickness of the tank wall between the bottom plate and the cover plate and delimiting a plurality of compartments filled with an insulating packing such as perlite, glass wool or rock wool. A general structure of this kind is described for example in WO2012/127141 or WO2017/103500.

An insulating block 5 may also be produced with a bottom plate 7, a cover plate 6 and possibly an intermediate plate, for example made of plywood. The insulating block 5 also includes one or more layers of insulating polymer foam 8 sandwiched between the bottom plate 7, the cover plate 6 and the possible intermediate plate and stuck thereto. The polymer insulating foam 8 may in particular be a foam based on polyurethane, optionally reinforced by fibers. A general structure of this kind is for example described in WO2017/006044.

The sealed membrane 4 may consist of a continuous layer of metal plates 9 welded edge to edge in sealed manner that includes two mutually perpendicular series of corrugations 10,11. The two series of corrugations 10, 11 may have a regular spacing or an irregular periodic spacing. The corrugations 10, 11 may be continuous and form intersections between the two series of corrugations 10, 11. Otherwise, the corrugations 10, 11 may feature discontinuities of some corrugations at the level of the intersections between the two series. The corrugated metal plates 9 are made of stainless steel.

In order to block the thermosiphon effect of circulation of gas in the space 12 between the thermally insulating barrier 3 and the supporting structure 2, hereinafter referred to as the barrier/support space 12, there is provision for segmenting that barrier/support space 12 so as to form zones 14 in succession in the direction of greatest slope of the tank wall 1.

Figure 2:
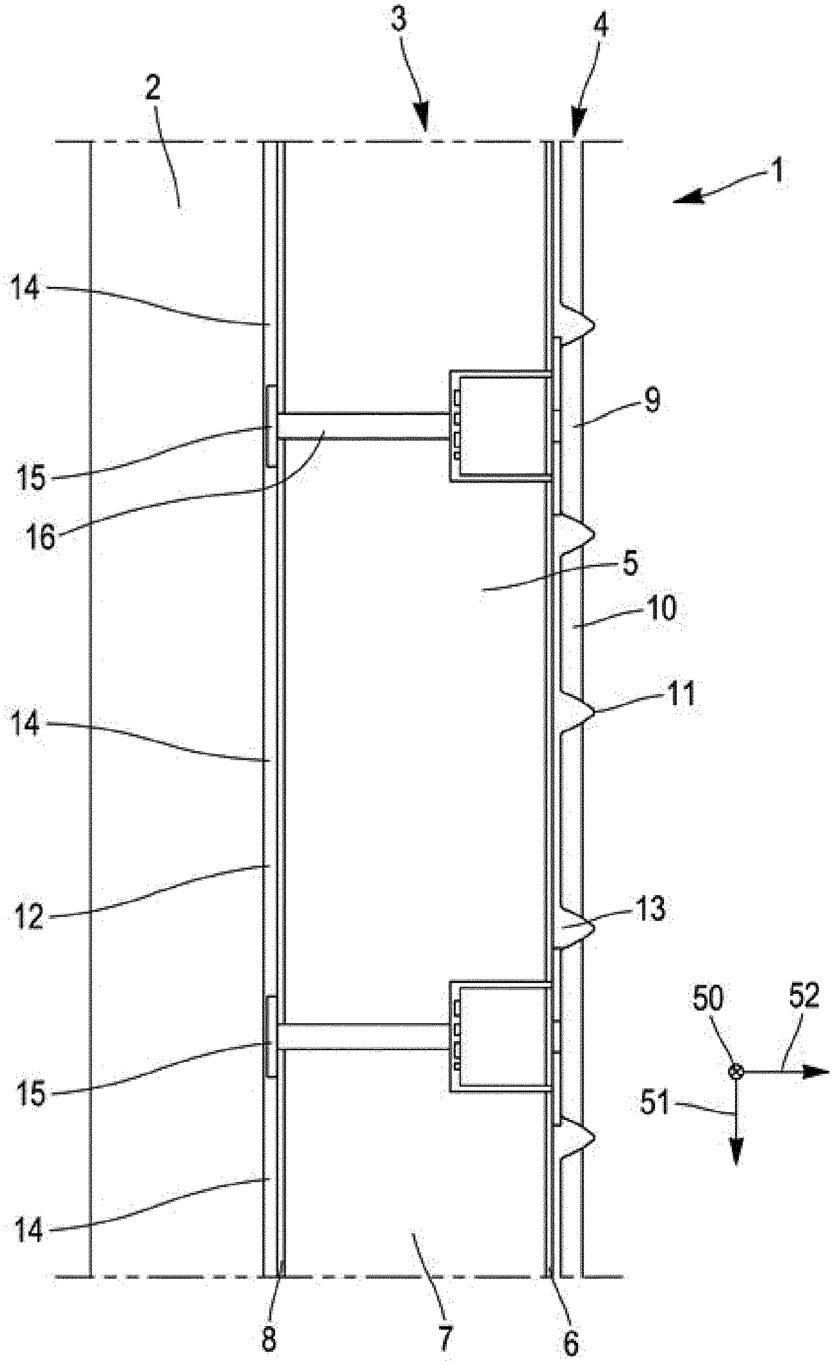
FIG. 2 is a view in section in the transverse direction of a tank wall in accordance with the first embodiment.

FIGS. 1 and 2 show a first embodiment in which sealed strips 15 segment the space between the thermally insulating barrier and the supporting wall in the direction 51 of greatest slope into a plurality of zones 14. In this embodiment the sealed strips 15 are placed at the junction between two rows of insulating blocks 5 extending in a transverse direction 50 inclined relative to the direction 51 of greatest slope. In the embodiment represented the transverse direction 50 corresponds to the horizontal direction i.e. the direction at an angle of 90° to the direction 51 of greatest slope of a vertical wall. The sealed strips 15 therefore extend over the entire transverse dimension of the tank wall 1 with no discontinuity. The sealed strips 15 are therefore rectilinear here. The sealed strips 15 may for example be formed of mastic or of closed cell polymer foam. In an embodiment not represented the transverse direction 50 may form a non-zero angle with the horizontal direction, for example between −20° and 20°.

As can be seen in FIG. 2, an insulating seal 19 is placed between two adjacent insulating blocks 5 in the direction of thickness of the tank wall 1. The insulating seal 19 enables filling of the spaces of the insulating blocks 5 in the direction of thickness so as to improve the thermal insulation of the thermally insulating barrier 3. The insulating seal 19 may for example consist of glass wool or of a sprayed polymer foam.

Figure 3:
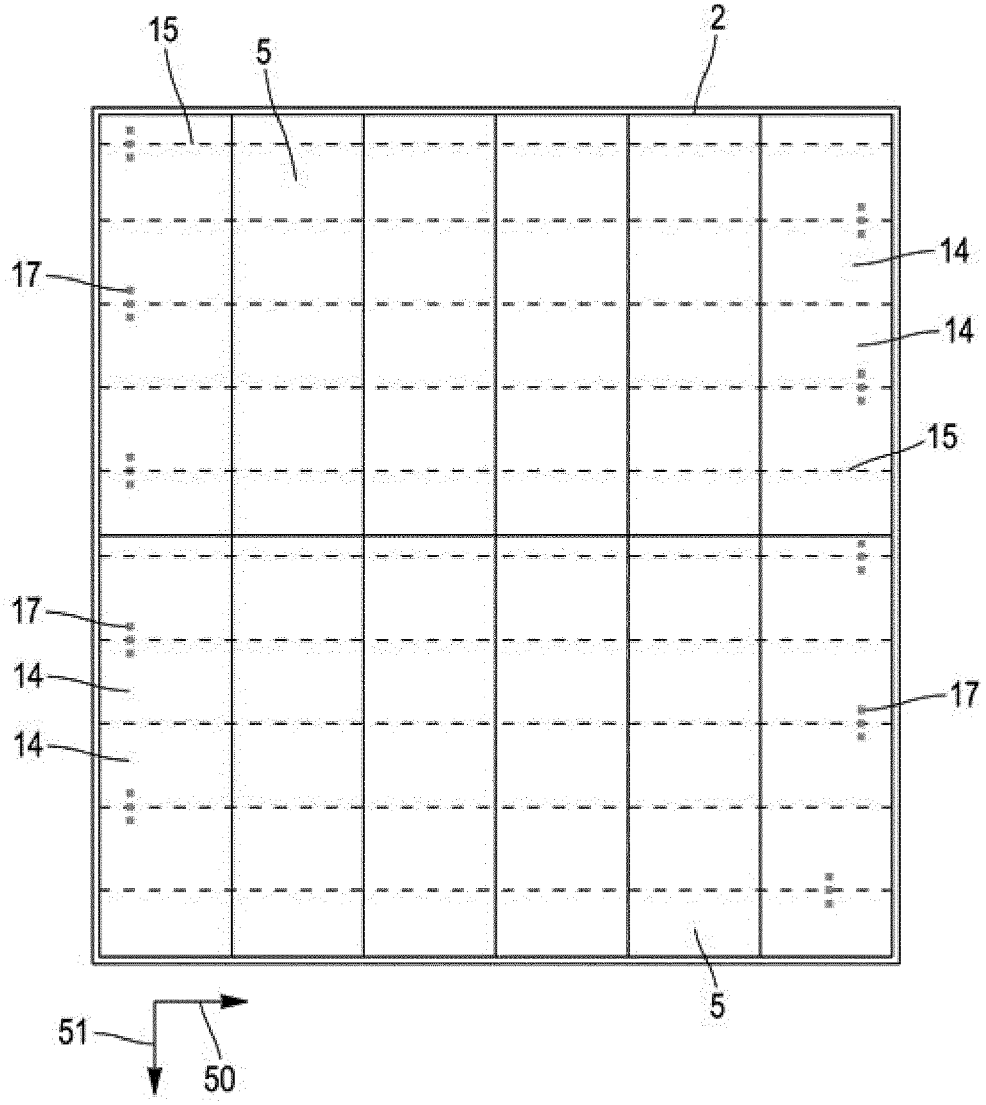
FIG. 3 is a schematic front view from inside the tank of a tank wall in accordance with a second embodiment with the sealed membrane omitted.
Figure 4:
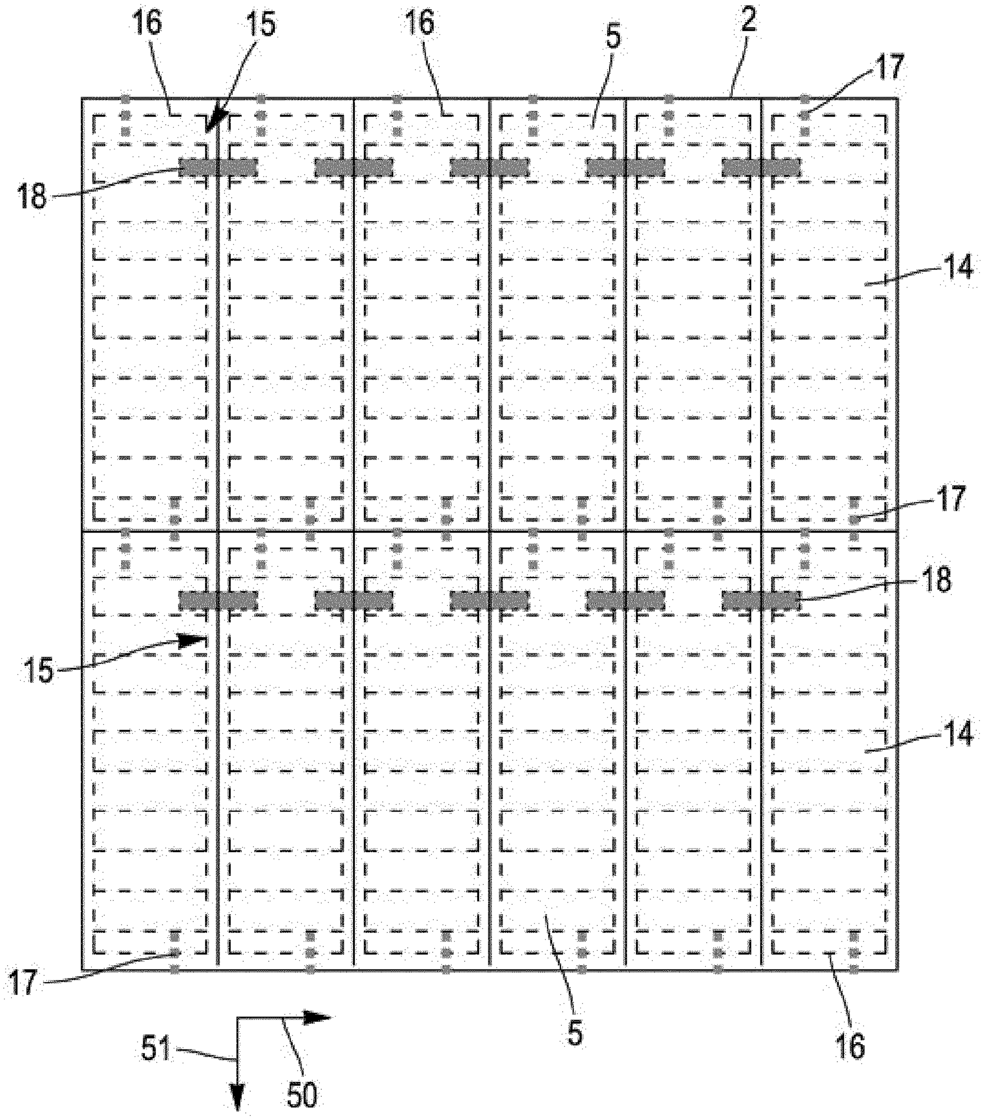
FIG. 4 is a schematic front view from inside the tank of a tank wall in accordance with a third embodiment with the sealed membrane omitted.

In FIGS. 3 and 4 elements illustrated in dashed line are drawn thus to represent their place between the insulating blocks 5 of the thermally insulating barrier 3 and the supporting structure 2.

FIG. 3 represents a second embodiment of segmentation of the barrier/support space 12 in the direction of greatest slope. In this illustration, for greater clarity, only the thermally insulating barrier 3 with some of the insulating blocks 5 and the supporting structure 2 are illustrated. In this embodiment, and in contrast to the first embodiment, the sealed strips 15 are distributed regularly or irregularly under the thermally insulating barrier 3 in the direction of greatest slope. Thus in the example illustrated a plurality of sealed strips 15 extend under each insulating block 5 of the thermally insulating barrier 3 in the transverse direction. Here the sealed strip 15 consists of beads of mastic placed on the supporting structure before positioning the insulating blocks 5.

Moreover, in this embodiment illustrated in FIG. 3 each sealed strip 15 is traversed in the direction of greatest slope by a communication channel 17 which therefore weakens the sealing property of the substantially sealed strip 15 without eliminating it completely. The communication channel 17 is for example formed by a porous material, for example by one or more braids of fibers, inserted in the sealed strip 15 so that the braids extend substantially in the direction of greatest slope and traverse the sealed strip 15 completely. The communication channel 17 is therefore a high head loss communication channel 17 because its represents for a flow of fluid in the barrier/support space 12 a singular head loss by the sudden change of section and/or by the porous material used.

Moreover, to accentuate the head loss generated by the communication channels 17 in the flow of fluid, the communication channels 17 of adjacent sealed strips 15 in the direction of greatest slope are positioned in a quincunx arrangement so that each zone 14 represents a channel for the flow extending in the transverse direction and the communication channel 17 represents for the flow a bend section between two adjacent zones 14.

FIG. 4 represents a third embodiment of the segmentation of the barrier/support space 12 in the direction of greatest slope. In this illustration, for greater clarity, only the thermally insulating barrier 3 with some of the insulating blocks 5 and the supporting structure 2 are illustrated. In this embodiment the segmentation is also effected with the aid of sealed strips 15. However, each sealed strip 15 is formed by a plurality of strip portions 16 connected to one another in the transverse direction by a fishplate 18, the fishplate 18 therefore being disposed between two adjacent strip portions 16.

As illustrated in FIG. 4, one of the strip portions 16 is placed on the lower surface of each insulating block 5, thus forming a pattern, so that the strip portions 15 are situated after installing the insulating blocks 5 in the barrier/support space 12. This pattern may be produced in various ways. In the embodiment represented this patterns forms a closed contour of the insulating block 5 and a plurality of rows spaced from the closed contour, extending in the transverse direction and distributed in the direction of greatest slope. Here the strip portions 16 are formed as before by beads of mastic.

A fishplate 18 is placed at the junction between two adjacent insulating blocks 5. It may also be disposed between other fishplates 18 regularly disposed at the junction between two adjacent insulating blocks 5. The fishplate 18 has a first end situated in the closed contour of the strip portion 16 of a first insulating block 5 and includes a second end situated in the closed contour of the pattern of the strip portions 16 of a second insulating block 5 adjacent to the first insulating block in the transverse direction. For a transverse row of insulating blocks 5 the sealed strip 15 is therefore formed by the strip portions 16 situated under each of these insulating blocks 5 and connected to one another by the fishplates 18 placed between these insulating blocks 5.

The fishplates 18 may have varying thicknesses so as to form so-called reference fishplates 18. In this case, the fishplates 18 also have a function of ensuring the flatness of the thermally insulating barrier 3 by compensating by means of their thickness the flatness defects of the supporting structure 2.

Moreover, communication channels 17 are formed in the closed contour of each insulating block 5 so that no pocket of fluid remains trapped under an insulating block 5. These communication channels 17 may be formed in the same manner as in the second embodiment or differently. As represented in FIG. 4, under the same insulating block 5 are placed two communication channels 17 disposed in a quincunx arrangement in the direction of greatest slope.

Figure 5:
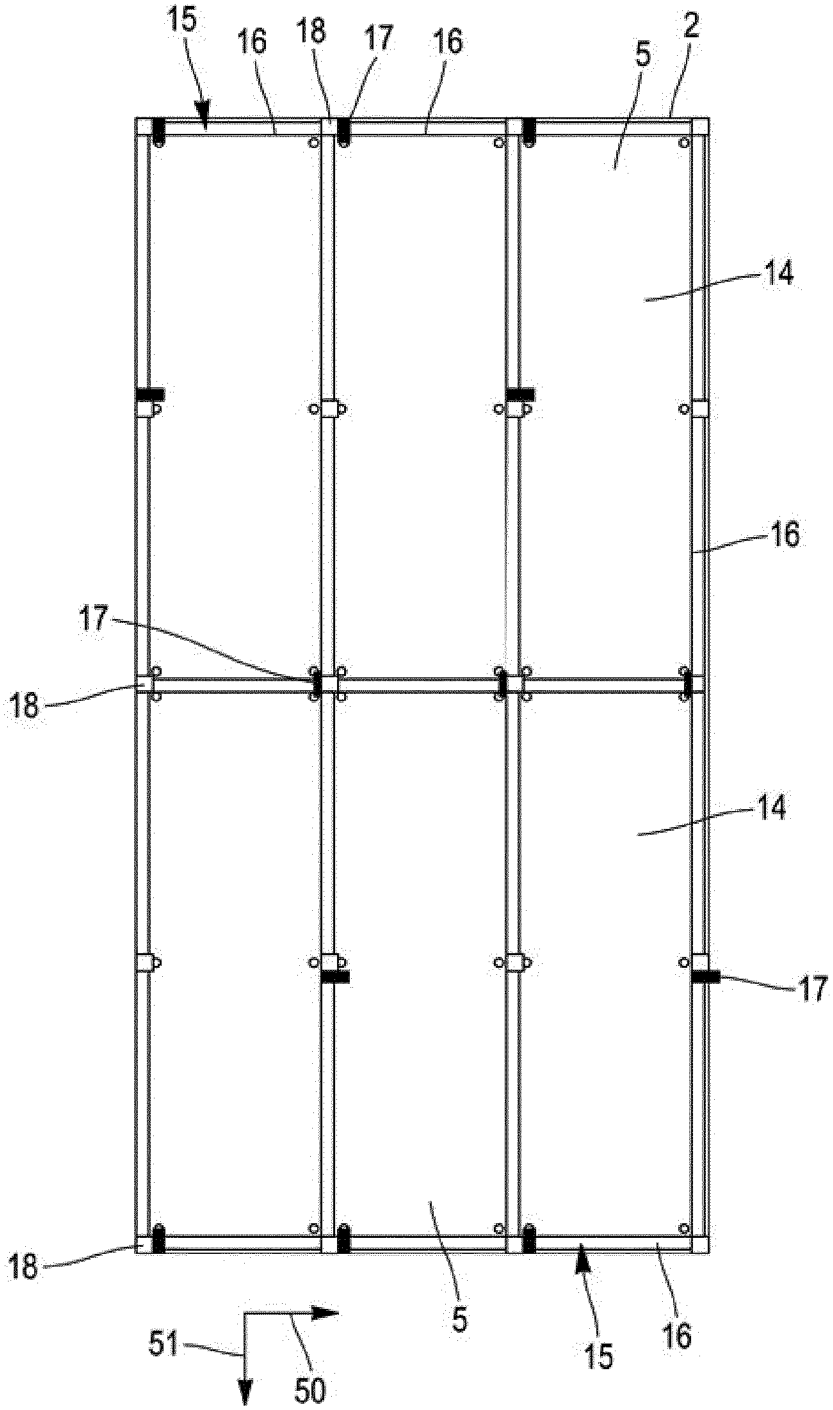
FIG. 5 is a schematic front view from outside the tank of a tank wall in accordance with a fourth embodiment.

FIG. 5 represents a fourth embodiment of the segmentation of the barrier/support space 12 in the direction of greatest slope. In this illustration, for greater clarity, only the thermally insulating barrier 3 with some of the insulating blocks 5 and the supporting structure 2 are illustrated. Moreover, in this illustration the supporting structure 2 is omitted (or represented as if transparent) and the point of view is from outside the tank so that the elements situated between the supporting structure 2 and the insulating blocks 5 are in the foreground. In this embodiment and in the same manner as in the third embodiment each sealed strip 15 is formed by a plurality of strip portions 16 connected to one another in the transverse direction by a fishplate 18, the fishplate 18 therefore being disposed between two adjacent strip portions 16.

However, in contrast to the third embodiment, here the strip portions 16 are placed at the junction between two adjacent insulating blocks 5 in the direction of greatest slope and optionally at the junction between two adjacent insulating blocks 5 in the transverse direction. Each strip portion 16 therefore extends at the level of the junction between two insulating blocks 5. The adjacent strip portions 16 in the transverse direction or the direction of greatest slope are connected to one another in sealed manner by a fishplate 18. Here the strip portions 16 are formed by a closed cell polymer foam.

As illustrated in FIG. 5, communication channels 17 traverse the strip portions 16 so that the spaces situated under the insulating blocks 5 of the same row in the direction of greatest slope are in fluidic communication thanks to the communication channels 17. These communication channels 17 may be formed in the same manner as in the second embodiment or differently. Moreover, under the same insulating block 5 are placed at least two communication channels 17 disposed in a quincunx arrangement in the direction of greatest slope. The fishplates 18 of the fourth embodiment may also be reference fishplates 18.

In the various embodiments described hereinabove a sealed membrane 4 and a thermally insulating barrier 3 have been illustrated and described. The tank wall 1 may thus consist only of only one sealed membrane 4 and only one thermally insulating barrier 3.

However, the tank wall 1 may also comprise a so-called dual membrane structure. In this case the thermally insulating barrier 3 described is a secondary thermally insulating barrier and the sealed membrane 4 is a secondary sealed membrane. The tank wall 1 therefore also includes a primary thermally insulating barrier carried by the secondary sealed membrane 4 and a primary sealed membrane carried by the primary thermally insulating barrier.

Figure 6:
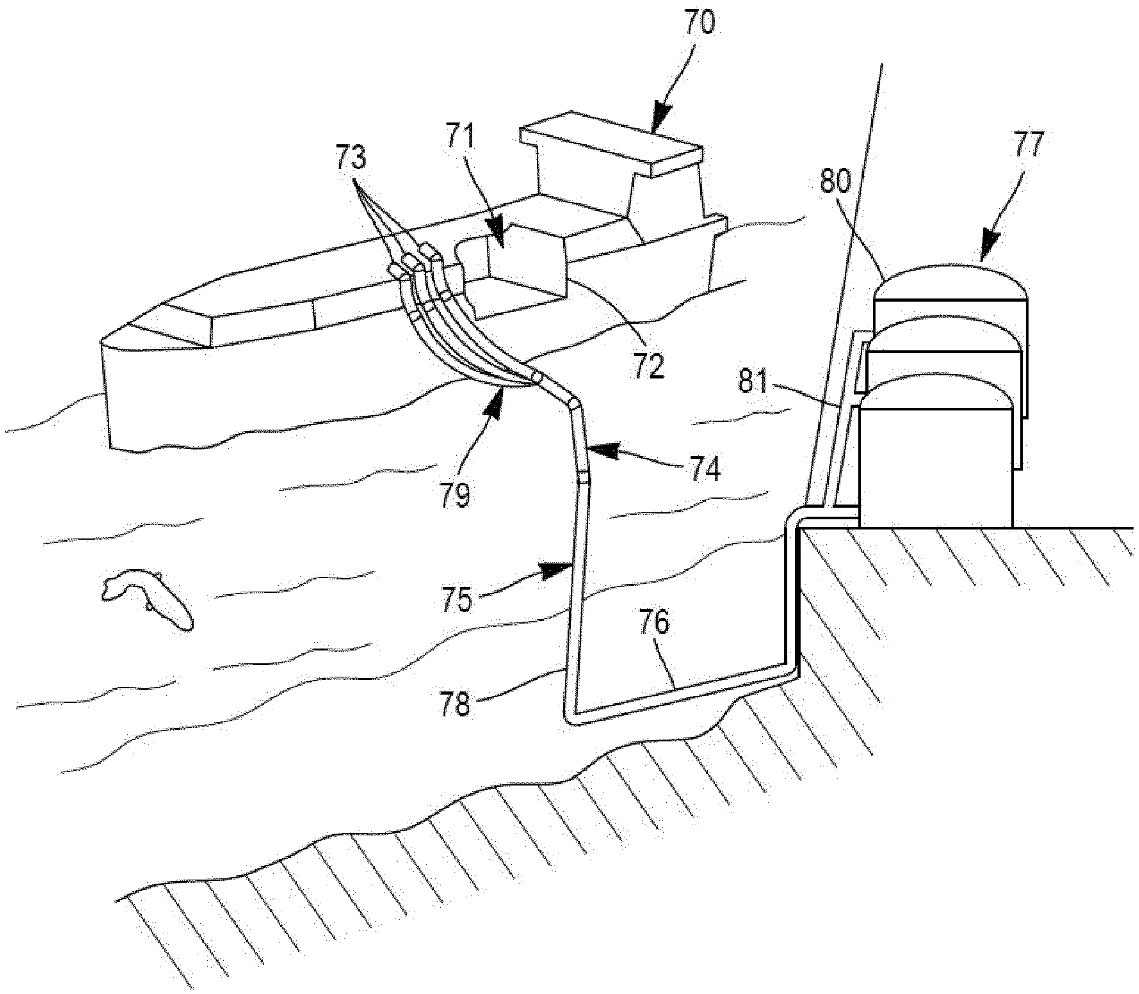
FIG. 6 is a schematic cutaway representation of a methane tanker ship tank and a terminal for loading/offloading that tank.

Referring to FIG. 6, a cutaway of a methane tanker ship 70 shows a sealed and insulated tank 71 of prismatic general shape mounted in the double hull 72 of the ship. The wall of the tank 71 includes a primary sealed barrier intended to be in contact with the LNG contained in the tank, a secondary sealed barrier arranged between the primary sealed barrier and the double hull 72 of the ship, and two insulating barriers respectively arranged between the primary sealed barrier and the secondary sealed barrier and between the secondary sealed barrier and the double hull 72.

In a manner known in itself loading/offloading pipes 73 disposed on the top deck of the ship may be connected by means of appropriate connectors to a maritime or harbor terminal to transfer a cargo of LNG from or to the tank 71.

FIG. 6 shows an example of a maritime terminal including a loading and offloading station 75, an underwater pipe 76 and a terrestrial installation 77. The loading and offloading station 75 is a fixed off-shore installation including a mobile arm 74 and a tower 78 that supports the mobile arm 74. The mobile arm 74 carries a bundle of insulated flexible tubes 79 that can be connected to the loading/offloading pipes 73. The orientable mobile arm 74 adapts to all methane tanker loading gauges. A connecting pipe that is not shown extends inside the tower 78. The loading and offloading station 75 enables loading and offloading of the methane tanker 70 from or to the terrestrial installation 77. The latter includes liquefied gas tanks storage 80 and connecting pipes 81 connected via the underwater pipe 76 to the loading or offloading station 75. The underwater pipe 76 enables transfer of the liquefied gas between the loading or offloading station 75 and the terrestrial installation 77 over a great distance, for example 5 km, which enables the methane tanker ship 70 to remain at a great distance from the coast during loading and offloading operations.

Pumps onboard the ship 70 and/or pumps equipping the terrestrial installation 77 and/or pumps equipping the loading and offloading station 75 are used to generate the pressure necessary to transfer the liquefied gas.

Although the invention has been described in connection with a plurality of particular embodiments, it is obvious that it is in no way limited to them and that it encompasses all technical equivalents and combinations of the means described if the latter fall within the scope of the invention.

The use of the verb "to include" or "to comprise" and conjugate forms thereof does not exclude the presence of elements or steps other than those stated in a claim.

In the claims, any reference sign between parentheses should not be interpreted as a limitation of the claim.

The invention claimed is:

1. A sealed and thermally insulating tank (71) incorporated in a supporting structure (2), the tank including at least one inclined tank wall (1) forming an angle with a horizontal direction and fixed to a supporting wall of the supporting structure (2), the tank wall (1) having a multilayer structure including successively, in the direction of the thickness (52) from the outside to the inside of the tank, a thermally insulating barrier (3) held against the corresponding supporting wall and a sealed membrane (4) carried by the thermally insulating barrier (3), the tank comprising sealed or substantially sealed strips (15) in the space formed between the thermally insulating barrier (3) and the supporting wall, wherein the sealed strips (15) segment the space between the thermally insulating barrier (3) and the supporting wall in a plurality of successive zones (14) in a direction of a greatest slope (51) of the wall, the zones (14) extending over an entire transverse dimension of the tank wall (1) in a transverse direction (50) inclined relative to the direction of the greatest slope.

2. The tank as claimed in claim 1, in which at least one of the sealed strips (15) is extended over all the transverse dimension of the tank wall (1).

3. The tank as claimed in claim 1, in which at least one of the sealed strips is formed of a polymer material, for example a mastic or a closed cell foam, for example a closed cell polyurethane foam, or the combination of an EPDM rubber strip with a polyester foam strip.

4. The tank as claimed in claim 1, in which at least one of the sealed strips (15) includes a plurality of strip portions (16) connected to one another in sealed manner by at least one fishplate (18), the fishplate (18) being disposed between two adjacent strip portions (16).

5. The tank as claimed in claim 4, in which the fishplate (18) has a first end situated in a first strip portion (16) and a second end situated in a second strip portion (16), the second strip portion (16) being adjacent to the first strip portion (16).

6. The tank as claimed in claim 4, in which the thermally insulating barrier (3) comprises a plurality of insulating blocks (5) juxtaposed to one another in the direction of the greatest slope and in the transverse direction, at least one of the sealed strips (15) being interrupted at the level of an interface or an interstice between two adjacent insulating blocks (5), the fishplate (18) being disposed between two adjacent insulating blocks (5) so as to connect two adjacent strip portions (16) in sealed manner.

7. The tank as claimed in claim 1, in which at least one of the substantially sealed strips (15) is traversed by a high head loss communication channel (17) so that the zones (14) separated by said at least one substantially sealed strip (15) are in slow fluidic communication enabling the pressure to be balanced between the two zones without allowing significant convective flow.

8. The tank as claimed in claim 7, in which each zone (14) is in fluidic communication with an adjacent zone (14) via at least high head loss communication channel (17).

9. The tank as claimed in claim 7, in which the head loss of a communication channel (17) is greater than or equal to , where AP is the minimum head loss of the communication channel, PG the driving pressure of the gas situated in the space between the thermally insulating barrier (3) and the supporting structure (2) of the tank wall (1) under normal conditions of use of the tank, and n representing the number of zones (14) segmented by the substantially sealed strips (15).

10. The tank as claimed in claim 9, in which the high head loss communication channel (17) includes a porous material filling the communication channel (17), the porous material having a porosity configured to result in a head loss greater than or equal to the minimum head loss ΔP.

11. The tank as claimed in claim 10, in which the porous material of the communication channel is chosen from melamine foam, open cell polyurethane (PU) foam and fiber braids.

12. The tank as claimed in claim 7, in which at least one of the substantially sealed strips is discontinuous only at the level of the communication channel or channels.

13. The tank as claimed in claim 7, in which a plurality of substantially sealed strips are traversed by a communication channel, the communication channel of a substantially sealed strip being offset from the communication channel of an adjacent substantially sealed strip in the transverse direction so as to form a network of communication channels in a quincunx arrangement.

14. The tank as claimed in claim 1, in which the thermally insulating barrier comprises a plurality of rows of insulating blocks extending in the transverse direction, the insulating blocks having a longitudinal dimension in the direction of greatest slope, two adjacent sealed or substantially sealed strips being spaced from one another in the direction of the greatest slope by a dimension equal or substantially equal to the longitudinal dimension of the insulating blocks.

15. The tank as claimed in claim 1, in which the sealed membrane (4) consists of a corrugated sealed membrane (4) including a plurality of corrugated metal plates (9) welded to one another.

16. The tank as claimed in claim 1, in which the tank comprises a single sealed membrane (4) and a single thermally insulating barrier (3).

17. The tank as claimed in claim 1, in which the sealed membrane (4) is a secondary sealed membrane and the thermally insulating barrier (3) is a secondary thermally insulating barrier, the tank including a primary thermally insulating barrier carried by the secondary sealed membrane and a primary sealed membrane carried by the primary thermally insulating barrier.

18. A ship (70) for the transport of a cold liquid product, the ship including a double hull (72) and a tank (71) as claimed in claim 1 disposed in the double hull.

19. A transfer system for a cold liquid product, the system including a ship (70) as claimed in claim 18, insulated pipes (73, 79, 76, 81) arranged in such a manner as to connect the tank (71) installed in the hull of the ship to a floating or terrestrial storage unit (77) and a pump for driving a flow of cold liquid product through the insulated pipes from or to the floating or terrestrial storage installation to or from the tank of the ship.

20. A method of loading or offloading a ship (70) as claimed in claim 18, in which a cold liquid product is routed through insulated pipes (73, 79, 76, 81) from or to a floating or terrestrial storage installation (77) to or from the tank (71) of the ship.

* * * * *